F. H. SHARPE.
DIVIDER.
APPLICATION FILED APR. 30, 1921.

1,416,987.

Patented May 23, 1922.
2 SHEETS—SHEET 1.

Inventor.
Frank H. Sharpe
by Heard Smith & Tennant.
Attys

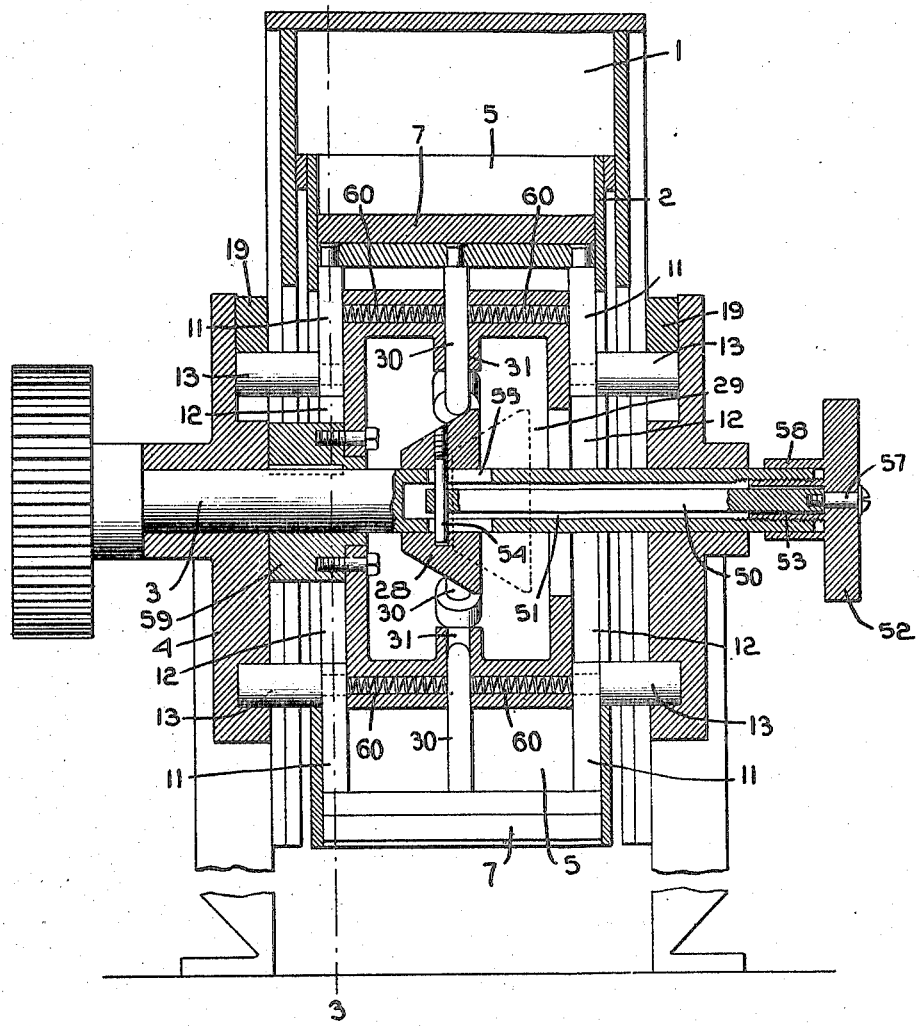

UNITED STATES PATENT OFFICE.

FRANK H. SHARPE, OF DORCHESTER, MASSACHUSETTS.

DIVIDER.

1,416,987.　　　　　　　Specification of Letters Patent.　　Patented May 23, 1922.

Application filed April 30, 1921. Serial No. 465,823.

*To all whom it may concern:*

Be it known that I, FRANK H. SHARPE, a citizen of the United States, and resident of Dorchester, county of Suffolk, State of Massachusetts, have invented an Improvement in Dividers, of which the following description, in connection with the accompanying drawing, is a specification, like characters on the drawing representing like parts.

This invention relates to dividers such as are used in bakeries for dividing from a dough mass portions of predetermined weight to be formed into loaves of bread, biscuits, rolls, etc., and it has particular reference to the means for effecting a proper adjustment of the movable bottoms of the pockets of the dividing element for the purpose of securing portions of dough of the desired weight.

I have herein chosen to illustrate my invention as it might be embodied in a divider of the type shown in my Patent No. 1,364,590, Jan. 4, 1921 but I desire to state that the invention is not necessarily limited to use in connection with a divider of this type.

In my above mentioned patent I have shown a divider comprising a rotary dividing member provided with a plurality of pockets to receive the portions of dough divided from the dough mass, a plunger or movable bottom in each pocket, means to withdraw the bottom of each pocket while said pocket is in communication with a receptacle containing the dough mass whereby the pocket is filled with dough, and means subsequently to move the plungers outwardly thereby to eject the divided dough portion from the pocket.

The present invention relates to an improved means for determining the distance which the bottom of each pocket can move inwardly thereby to determine the volume or size of dough which is required to fill the pocket.

In order to give an understanding of my invention I have illustrated in the drawings a selected embodiment thereof which will now be described after which the novel features will be pointed out in the appended claims.

Fig. 2 is a section on substantially the line 2—2 Fig. 1.

Figure 1:
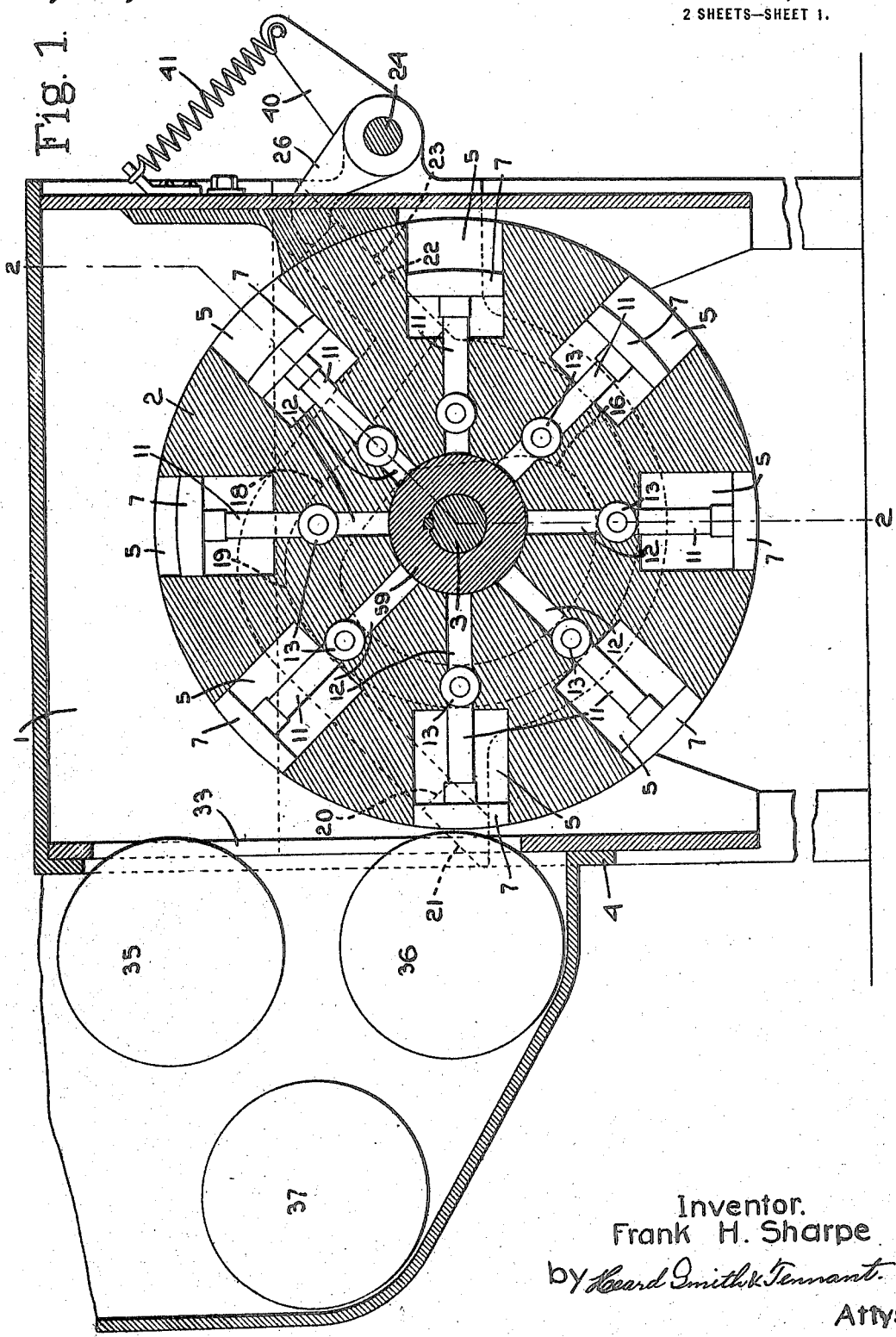
Fig. 1 is a sectional view through a divider embodying my invention, said section being taken on substantially the line 3—3, Fig. 2.

The dividing element is illustrated at 2 and it is mounted on a shaft 3 which is journalled in a frame 4. The frame 4 supports a receptacle 1 in which the dough mass is received and said receptacle has an opening 33 in one side through which the dough is introduced into the receptacle, said dough being fed into the receptacle by the feed rolls 35, 36 and 37 all as illustrated in the above mentioned patent. The dividing element 2 is in the form of a cylinder or drum which is provided with a plurality of pockets 5 in its periphery, these pockets being brought successively into communication with the receptacle 1 as the member 2 rotates. Each pocket is provided with a movable bottom 7 which is adapted to move from the mouth of the pocket as shown at the left hand side of the member 2 in Fig. 1 inwardly to a position which is determined by the mechanism hereinafter described and which determines the maximum volume of the pocket. The movable bottoms 7 are moved inwardly by means of cam members 19 and they are moved outwardly by means of a cam 16. There is a cam 19 and 16 at each side of the machine and each movable bottom 7 is provided with two inwardly-directed arms 11 operating in guiding grooves 12 formed in the ends of the drum 2 and carrying laterally-extending rolls 13 which are situated to be engaged by the cams 19 and 16 as the drum rotates. The engagement of the rolls 13 with the cam 16 will force the movable bottoms outwardly and the engagement of said rolls with the face 18 of the cam 19 will draw the bottoms inwardly all as described in my above mentioned patent. The cam 19 is provided at its ends with the extensions 20 and 22 which are parallel to each other and which are slidably mounted in grooves 21 and 23 formed in the side walls of the frame. The extensions 22 are acted upon by fingers 26 fast on the rock shaft 24 and said rock shaft has an arm 40 extending therefrom to which is connected one end of a pulling spring 41, the other end of said spring being connected to the frame. The action of the spring 41 will be to force the came 18 inwardly.

The parts thus far described, except for the spring 41, are, or may be, all as shown in my above mentioned patent and form no part of my present invention.

In order to control the extent to which the movable bottoms 7 are moved inwardly by the cam 19 I have provided a stop member in the form of a cone shaped element 28 which is slidably mounted on the shaft 3, the drum 2 being provided with the central chamber 29 to receive the cone 28. Each bottom 7 has a stop pin 30 secured thereto and extending inwardly therefrom, said stop pins operating in apertures 31 formed in the drum 2. These stop pins 30 co-operate with the cone 28 to limit the extent to which the movable bottoms 7 are moved inwardly. When the cone member is adjusted into the position shown in Fig. 2 the larger end of the cone is positioned to be engaged by the pins 30 as the plungers are moved inwardly, and with this adjustment the movable bottoms will have their minimum inward movement. On the other hand if the cone 28 is adjusted into the dotted line position Fig. 2 then the smaller portion of the cone will be situated to act as the stop for the pins 30 and each movable bottom can consequently move inward to a greater extent. The yielding movement of the cam 19 is necessary in connection with this form of stop device because when the movable bottoms have been carried inwardly by the cam to a position determined by the cone 28 then the cam 19 will yield in opposition to the action of the spring 40 so that the face 18 thereof will assume a position corresponding to the adjustment of the cone 28.

The cone 28 may be adjusted longitudinally of the shaft 3 in any suitable way.

I have herein shown the cone as connected to an adjusting rod 50 which is situated within an axial bore 51 formed in the shaft 3 and which is connected at its outer end to a hand wheel 52. This hand wheel is provided with a hub 53 which enters the bore 51 and has screw-threaded engagement therewith so that when the hand wheel is turned the rod 50 will be advanced or retracted. Said rod 50 is connected to the cone 28 by means of a pin 54 which is carried by the cone and extends through a slot 55 formed in the shaft and also extends through the end of the rod 50. The hand wheel 52 is connected to the rod 50 by means of a shouldered screw 57, so as to provide a swivel connection between the hand wheel and rod. The two parts are thus compelled to move longitudinally as a unit but the hand wheel can rotate independently of the rod. The hand wheel 52 is shown as provided with a flange 58 which surrounds the end of the shaft 3.

With this construction the cone 28 can be readily adjusted longitudinally of the shaft simply by turning the hand wheel 52 and the position of the cone determines the amount of dough which each pocket will contain.

The above construction is not only simple to manufacture but it is one by which the desired adjustment can be quickly and accurately effected.

60 indicates springs carried by the drum 2 and which bear against the arms 11 and pins 30 and provide sufficient friction to prevent the pocket bottoms from any movement except such as is produced by the cams 16 and 19.

I claim.

1. In a divider, the combination with a rotary divider element having a plurality of pockets each provided with a movable bottom, of a rotatable shaft on which said dividing element is carried, means to move the pocket bottoms inwardly as the dividing member rotates, and a cone shaped controlling member adjustable longitudinally of the shaft and determining the extent to which the pocket bottoms can move inwardly.

2. In a divider, the combination with a shaft, of a dividing element mounted thereon and provided with a chamber through which the shaft extends, said dividing element having a plurality of pockets each provided with a movable bottom, means to move the pocket bottoms inwardly as the shaft rotates, a cone shaped controlling member situated within said chamber and slidable longitudinally of the shaft, said controlling member determining the extent to which the pocket bottoms can be moved inwardly.

3. In a divider, the combination with a rotary dividing element having a plurality of pockets each provided with a movable bottom, of a shaft on which said dividing element is carried, means to move the pocket bottoms inwardly as the shaft rotates, a cone shaped controlling member slidably mounted on the shaft and determining the extent to which the pocket bottoms can move inwardly, and means at the end of the shaft to adjust said member longitudinally.

4. In a divider, the combination with a rotary dividing element having a plurality of pockets each provided with a movable bottom, of a shaft on which said dividing element is carried, means to move the pocket bottoms inwardly as the shaft rotates, a stop pin secured on and extending inwardly from each pocket bottom, a cone shaped controlling member slidably mounted on the shaft and co-operating with said stop pins to determine the extent to which the pocket bottoms can move inwardly, and means to adjust said cone member on the shaft.

In testimony whereof, I have signed my name to this specification.

FRANK H. SHARPE.